United States Patent Office 2,776,188
Patented Jan. 1, 1957

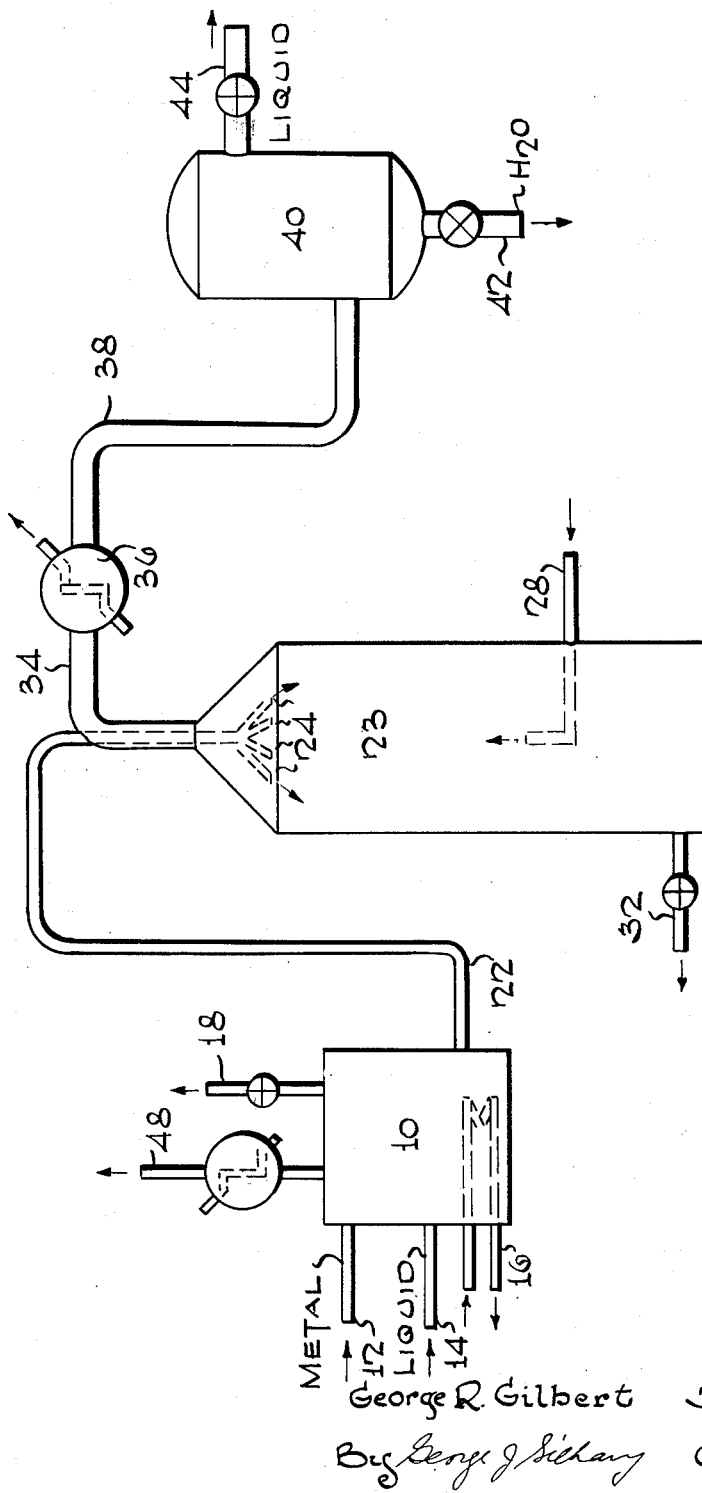

2,776,188

HYDROLYZING AND DRYING ALUMINUM ALCOHOLATES WITH SUPERHEATED STEAM

George R. Gilbert, Elizabeth, N. J., assignor to Esso Research and Engineering Company, a corporation of Delaware Application November 1, 1952, Serial No. 318,265

4 Claims. (Cl. 23—143)

This invention relates to an improved process for the manufacture of contact or catalytic substances such as metal oxide gels in microspherical or microspheroidal form, and more particularly relates to the preparation of microspherical or microspheroidal alumina-containing substances.

According to the present invention metal oxide gels are prepared by spraying hydrolyzable metal compounds into an atmosphere of steam or water vapor. The hydrolyzable metal compounds include aluminum alcoholates, phenolates and cresylates of aluminum, magnesium, zinc, titanium, calcium, chromium, manganese, etc. or alloys thereof. The spray drying forms microspheres of the alcoholate, phenolate or cresylate as a first stage or step. The steam or water vapors then immediately hydrolyze the microspheres of alcoholate, phenolate or cresylate to form metal oxide microspheres of high purity and high stability. When using an aluminum alcoholate the overhead steam and alcohol are condensed and separated. Where substantially water insoluble alcohols are used in making the metal alcoholate, recovery of the alcohol for reuse in the process is simplified. The phenols and cresols resulting from the hydrolysis of the metal phenolates or cresylates are substantially water insoluble and recovery of them is relatively simple. The microspheres may be further dried by distilling residual alcohol, phenol, cresol and hydrocarbon solvent, if one is used.

In the drawing, the figure represents one form of apparatus adapted for carrying out the process of the present invention.

Referring now to the drawing the reference character 10 designates a reactor into which metal particles are introduced through line 12. The preparation of aluminum alcoholate using a substantially water insoluble anhydrous alcohol will be first described. An alcohol such as amyl alcohol or a commercial mixture of isomeric amyl alcohols is introduced into reactor 10 through line 14. Preferably a small amount of catalyst such as mercuric chloride or similar catalyst such as mercury salts, iodine, aluminum halide, etc. is added to the reactant mixture in reactor 10. Preferably, instead of using only an alcohol or mixture of alcohols, an alcohol-hydrocarbon solution is used, the hydrocarbon being heptane, octane or octane mixtures, or the like or preferably a hydrocarbon distillate boiling in the range of about 200° F. to 500° F. When using a hydrocarbon diluent it may be used in equal proportion to the alcohol, that is, 50–50% by volume but the hydrocarbon may range from 0–90% by volume of the mixture. The aluminum may be in the form of chips, shots, turnings, ingots or the like.

The mixture of alcohol-hydrocarbon and aluminum in the reactor 10 is heated to about 200° F. to 300° F., preferably about 250° F. to start the reaction. The heating is preferably done by steam coil or the like 16 but other forms of heating may be used. After the reaction starts it is exothermic and then it is necessary to cool the contents of reactor 10 by passing a cooling medium through coil 16.

During the reaction hydrogen is formed and may be withdrawn from the reactor 10 via line 18 and recovered.

The aluminum amylate in amyl alcohol solution or in amyl alcohol-hydrocarbon solution is withdrawn from reactor 10 through line 22 at a temperature of about 200° to 300° F. The hot amylate is then introduced into the upper portion of a spray tower 23 by spray means 24 to produce small particles or droplets of the alcoholate solution. Steam is introduced into the lower portion of tower 23 through line 28. The steam is preferably superheated to about 250° to 500° F. and flows upwardly through the tower 23 in countercurrent flow to the sprayed alcoholate solution. A sufficient amount of steam is used to immediately hydrolyze the microspherical droplets of alcoholate and partially dry the microspherical alumina gels formed by the hydrolysis step. The droplets are further dried as they pass down through the tower 23 countercurrent to the upflowing steam. The formed microspherical alumina particles collect on the bottom of the tower 23 and are withdrawn through line 32. The microspherical alumina particles still contain some liquid or moisture, from 15 to 25%, and are preferably dried in a dryer (not shown).

The microspherical alumina particles having a particle size between about 5 and 200 microns with most of the particle size between about 20 and 100 microns in diameter can be activated and used as alumina particles or they may be impregnated with aqueous or other solutions containing catalytic substances which upon further treatment such as heating and activation produce active metal oxides or the like supported on the alumina particles.

Vapors of alcohol and water vapor pass overhead from tower 23 through line 34 and are cooled and condensed by passing through condenser 36. The condensate liquid is passed through line 38 to separator 40 and when using a substantially water insoluble alcohol such as amyl alcohol, the condensate will form into two layers, the bottom layer being water and the top layer being the alcohol. The water is withdrawn from the bottom of the tank 40 through line 42 and the alcohol is withdrawn from an upper portion of separator 40 through line 44. The alcohol will contain some water and it is only necessary to heat it to drive off the water to make anhydrous alcohol which is reused in the alcoholate process to react with further amounts of aluminum.

The alcohols used in the manufacture of the alcoholates may range from $C_1$ to $C_{10}$ carbon atoms per molecule but the preferred alcohols are those in the $C_4$ to $C_6$ range having only partial miscibility or solubility in water. When water soluble alcohols are used, the recovery of the alcohols from the condensate liquid passing to separator 40 is more expensive.

According to the present invention phenol or cresol or substituted phenols or cresols in substantially anhydrous form are reacted with a metal or metals to form the corresponding phenolate or cresylate which is hydrolyzed with steam to produce alumina or other metal oxide in microspherical or microspheroidal form. Mixtures of phenol and cresols may be used. With phenol or cresol the phenolate or cresylate of metals such as aluminum, magnesium, zinc, titanium, calcium, chromium, manganese, alloys thereof, such as aluminum-zinc, aluminum-chromium, aluminum-manganese and the like may be used. A small amount of catalyst such as mercuric salts, iodine, aluminum halide, etc., with mercuric chloride preferred is used to promote the reaction.

One method of making the phenolate or cresylate is to mix the aryl alcohol and the metal and heat the mixture to the boiling point of the aryl alcohol while refluxing the aryl alcohol passing overhead from the still or reactor. An excess of aryl alcohol is used to provide a solvent for the phenolate or cresylate formed. The apparatus shown in the drawing is also useful for this process and when refluxing the aryl alcohol, a reflux condenser 48 is used to condense the aryl alcohol and return it to the reactor 10. The heating is continued until the metal is dissolved or the reaction completed. It is necessary to heat the reaction mixture to about 350° F. to 400° F., preferably about 356° F. for phenol and about 374° F. for cresol mixtures to initiate the reaction between aluminum and the aryl alcohol. During the reaction the temperature of the mixture is maintained at about 350° F. to 400° F. The products of reaction comprise a solution of a metal phenolate or cresylate in phenol or cresol and are withdrawn from reactor 10 at a temperature of about 350° to 400° F. through line 22 and passed to the upper portion of spray tower 23 where the liquid is sprayed and formed into microspheres by spray means 24.

Steam at a temperature of about 300° F. to 600° F. is introduced into the lower portion of spray tower 23 through line 28. The steam upon contact with the microspheres of arylate, hydrolyzes the arylate microspheres and partially dries them. The partially dried and hydrolyzed particles are then further dried as they pass down through tower 23 countercurrent to the upflowing steam. The formed alumina or other metal oxide produced by the hydrolysis still contains some liquid or moisture and are collected on the bottom of tower 23 from which they are withdrawn via line 32. The alumina or other metal oxide particles in microspherical form are preferably further dried and may be activated or impregnated with catalytic substances and then heated and activated to produce catalysts. Or the alumina or other metal oxide may be used as such as an adsorbent, catalyst, etc.

The materials prepared according to the present invention are characterized by high surface area and by high purity eliminating any necessity for removal of harmful ions.

Vapors including the aryl alcohol and water pass overhead from tower 23 through line 34 and are condensed and passed to separator 40 as above described in connection with the hydrolysis of the alcoholate. The aryl alcohol separates as a top layer in separator 40 and is withdrawn through line 44. The water separates as the lower layer and is withdrawn through line 42. The aryl alcohol withdrawn through line 44 contains a small amount of water and it is only necessary to heat the aryl alcohol to remove the water and produce anhydrous aryl alcohol which can be reused for reaction with additional metal in reactor 10. The aqueous layer may be saturated with $CO_2$-containing gas to recover the relatively small amount of aryl alcohol dissolved in it.

Some preparations of aluminum alcoholate, aluminum-zinc phenolate and cresylate will first be given.

Example I

About 54 grams of aluminum turnings were dissolved in two liters of a mixture comprising anhydrous n-amyl alcohol and a petroleum distillate boiling within a range of about 300° to 400° F. The mixture of alcohol and petroleum distillate was in a ratio of one part of alcohol to one part of petroleum distillate by volume. A small amount of mercuric chloride, about .0001 part of mercuric chloride per part of aluminum metal by weight was added. To initiate the reaction, the mixture was heated to the boiling point of the liquid mixture after which the reaction proceeded to completion without further heating. A solution of aluminum amylate was obtained.

Example II

About 400 grams of zinc aluminum alloy in chip form and containing about 54% by weight of zinc and 46% by weight of aluminum were reacted with about 2500 grams of anhydrous phenol in a refluxing still using about 1 gram of mercuric chloride as catalyst or promoter. The reactant mixture was kept at the boiling point of phenol at atmospheric pressure until practically all the metal was dissolved while refluxing the phenol. A solution of zinc and aluminum phenolates in phenol was obtained.

Example III

About 2500 cc. of anhydrous USP cresol were reacted with about 400 grams of an alloy containing about 46% aluminum and about 54% zinc using mercuric chloride as a promoter. The reactant mixture was kept at atmospheric pressure at the boiling point of cresol until the alloy went into solution while refluxing the cresol. A solution of zinc and aluminum cresylates in cresol was obtained.

Coming now to the preparation of microsphere or microspheroidal alumina or other metal oxides, the aluminum alcoholate solution prepared as given in Example I is taken from the reactor of a temperature of about 200° to 300° F. and sprayed into the upper portion of a tower to form microspherical particles or droplets of the alcoholate. Superheated steam at a temperature of about 250° to 500° F. is introduced into the lower portion of the tower to flow upward countercurrent to the droplets of alcoholate. Enough steam is used so that the resulting microspheres will not compact during subsequent treatment. The steam hydrolyzes the alcoholate droplets to form alumina droplets and to regenerate n-amyl alcohol which is vaporized and passes overhead with steam. The overhead vapors are condensed to recover n-amyl alcohol for reuse in the process. As the alumina particles fall down through the tower they are further contacted with steam to further dry the microspherical or microspheroidal alumina particles. The formed alumina particles containing about 15–25% water are collected at the bottom of the tower from which they are withdrawn.

The recovered alumina particles are then further dried in any suitable manner and may be activated by heating to about 650° to 1200° F. or higher for about 3 to 24 hours. The dried and activated alumina particles have a particle size in the range of about 5 to 200 microns with most of the particles being in the range between about 20 and 100 microns. The activated alumina has a high surface area and can be used as such as an adsorbent, as a catalyst or as a catalyst base for desulfurization, hydroforming, cracking processes, etc.

The alumina particles before or after drying may be impregnated with molybdenum or chromium-containing solutions to form hydroforming catalysts or may be mixed with silica sol or hydrogel to produce cracking catalysts. Other catalytic-containing solutions or materials may be used for impregnating the alumina particles.

For the preparation of zinc aluminate or spinel catalyst suitable for aromatizing reactions or hydroforming, the solution of zinc and aluminum phenolates from Example II or zinc and aluminum cresylates from Example III is taken from the reactor at a temperature of about 350° to 400° F. and sprayed into a tower similar to that above described. Superheated stream at a temperature of about 300° to 600° F. is introduced into the lower portion of the tower for upward passage therethrough. The steam hydrolyzes the zinc-aluminum arylate to form zinc-aluminum oxides and regenerates the aryl alcohol which passes overhead with steam. The overhead vapors are condensed to recover the aryl alcohol for reuse in the process. The microspheres or microspheroidal particles of zinc aluminate are recovered from the bottom of the tower and further dried and activated as desired. The dried zinc aluminate particles may be impregnated with an aqueous solution of molybdenum or chromium and then heated and activated to produce an aromatizing or hydroforming catalyst.

While the phenolates, cresylates and alcoholates have been described as being removed hot from the reactor and then passed to the spray drier, the arylates or alcoholates in solution at ordinary temperatures may be used, but it is preferred to preheat them before spraying them into the tower.

The invention is also useful for spray-drying or hydrolyzing with steam aluminum alcoholate solutions containing dissolved organic silica-containing compounds. For example, ethyl silicate is dissolved by mixing in an aluminum amylate solution or other alcoholate solution. The aluminum alcoholate solution preferably contains n-amyl alcohol and a hydrocarbon distillate boiling between about 200° and 500° F. By spraying such a solution into a superheated steam atmosphere as above described, there are obtained microspheres of alumina impregnated with silica. The silica content of the silica-alumina mixture may range from about 5 to 95%. The silica alumina composites may be used as catalysts, catalyst bases or adsorbents.

Also other solutions may be treated according to this invention, that is, by spray drying into superheated steam to form microspheres. Aluminum alcoholate solutions containing metallic soaps, such as the naphthenates, oleates, palmitates, stearates, etc. of Cr, Ni, Fe, Cu, Mn, Pb, Mo, Co etc. may be spray-hydrolyzed to produce microspherical aluminas containing thoroughly dispersed oxides of one or more of the catalytic metals mentioned. The organic acids regenerated by the hydrolysis can be recovered and reused to make more metallic soaps.

Other solutions such as alcoholic solutions, containing no aluminum alcoholate, of metallic soaps can be hydrolyzed with steam to form microspheres of the oxides, such as high surface area chromia, nickel oxide, copper oxide, zinc oxide, etc. or thoroughly dispersed mixtures thereof. Instead of alcoholic solutions, hydrocarbon distillate solutions can be used. The organic acids liberated by the hydrolysis can be recovered and reused. Hydrocarbon distillate solutions of chromium or other metallic soaps may be used and, if desired, ethyl silicate may be added to the solution of hydrocarbon distillate and metal soap to produce a mixture or composite of metal oxides.

In some cases concurrent flow of the superheated steam and solution to be treated may be used in the spray drying tower in which event provision is made for separating the microspheres from the vapors.

What is claimed is:

1. A process for producing small spherical inorganic gel particles which comprises dispersing a solution of a metal alcoholate compound at a temperature above about 200° F. in the form of small droplets into the upper portion of a vertical contacting zone for downward flow therethrough, introducing superheated steam at a temperature above about 250° F. into the lower portion of said vertical contacting zone for upward flow therethrough, contacting the downwardly moving droplets of solution with said upflowing superheated steam in the upper portion of said contacting zone to hydrolyze the metal alcoholate compound in droplet form to form metal oxide particles and to regenerate the alcohol and to partially dry the formed metal oxide particles, further contacting the downwardly moving partially dried metal oxide particles in the lower portion of said contacting zone as they pass downwardly therethrough with said upflowing superheated steam as the sole drying gas to further dry the metal oxide particles, removing steam and regenerated alcohol as vapors overhead from said contacting zone and removing formed small spherical particles of metal oxide from the bottom of said contacting zone.

2. A process according to claim 1 wherein said metal alcoholate comprises aluminum alcoholate and the dried metal oxide spherical particles comprise alumina.

3. A process according to claim 1 wherein said metal alcoholate comprises a mixture of zinc and aluminum phenolates and the dried metal oxide spherical particles comprise zinc oxide and alumina.

4. A process according to claim 1 wherein said metal alcoholate comprises a mixture of zinc and aluminum cresylates and the dried metal oxide spherical particles comprise zinc oxide and alumina.

References Cited in the file of this patent

UNITED STATES PATENTS

| | | |
|---|---|---|
| 2,468,857 | Anderson et al. | May 3, 1949 |
| 2,570,058 | Hunter | Oct. 2, 1951 |
| 2,636,865 | Kimberlin | Apr. 28, 1953 |